United States Patent [19]
Fan et al.

[11] Patent Number: 5,970,812
[45] Date of Patent: Oct. 26, 1999

[54] QUICKLY MOVABLE ELASTICALLY ENGAGING SCREW-AND-NUT MECHANISM

[75] Inventors: Chaolai Fan, 112 Stalin Street, Changchun, Jilin 130022; Yongjie Fan, Jilin, both of China

[73] Assignee: Chaolai Fan, Jilin, China

[21] Appl. No.: 08/801,216

[22] Filed: Feb. 18, 1997

Related U.S. Application Data

[63] Continuation-in-part of application No. PCT/CN95/00068, Aug. 18, 1995.

[30] Foreign Application Priority Data

Aug. 18, 1994 [CN] China ................................ 94114934
Aug. 18, 1994 [CN] China ................................ 94218458

[51] Int. Cl.[6] .................................................. F16H 1/18
[52] U.S. Cl. ................................. 74/424.8 A; 269/181
[58] Field of Search ......................... 74/424.8; 269/181, 269/182

[56] References Cited

U.S. PATENT DOCUMENTS 4,834,355  5/1989  Fan ............................................ 269/181
4,923,185  5/1990  Fan ............................................ 269/181
5,282,392  2/1994  Fan et al. ............................. 74/424.8 A

FOREIGN PATENT DOCUMENTS 2057131   5/1990   China .
2065969   11/1990  China .
1047466   12/1990  China .
2078210   6/1991   China .
1065514   10/1992  China .
2139872   8/1993   China .

*Primary Examiner*—Charles A. Marmor
*Assistant Examiner*—David Fenstermacher

[57] ABSTRACT

A screw-and-nut mechanism comprises a supporting seat, one or more semi-nuts and the actuating member thereof, characterized in that the engagement of internal thread on the semi-nut with external threa on the screw is started elastically, then completed and locked by a positive element, and that the disengagement thereafter of the related elements is accomplished positively. Such a mechanism can be used in various kinds jacks, vices, sliding tables of machine tools, as well as other devices which is driven by a screw and desired to pas through its return travel quickly.

3 Claims, 12 Drawing Sheets

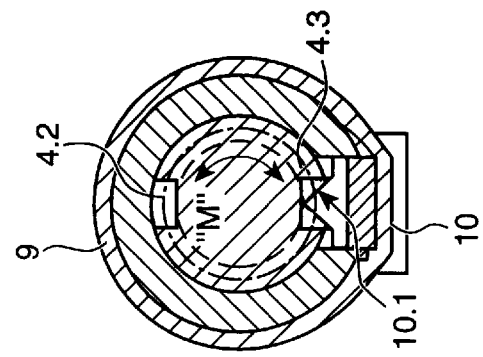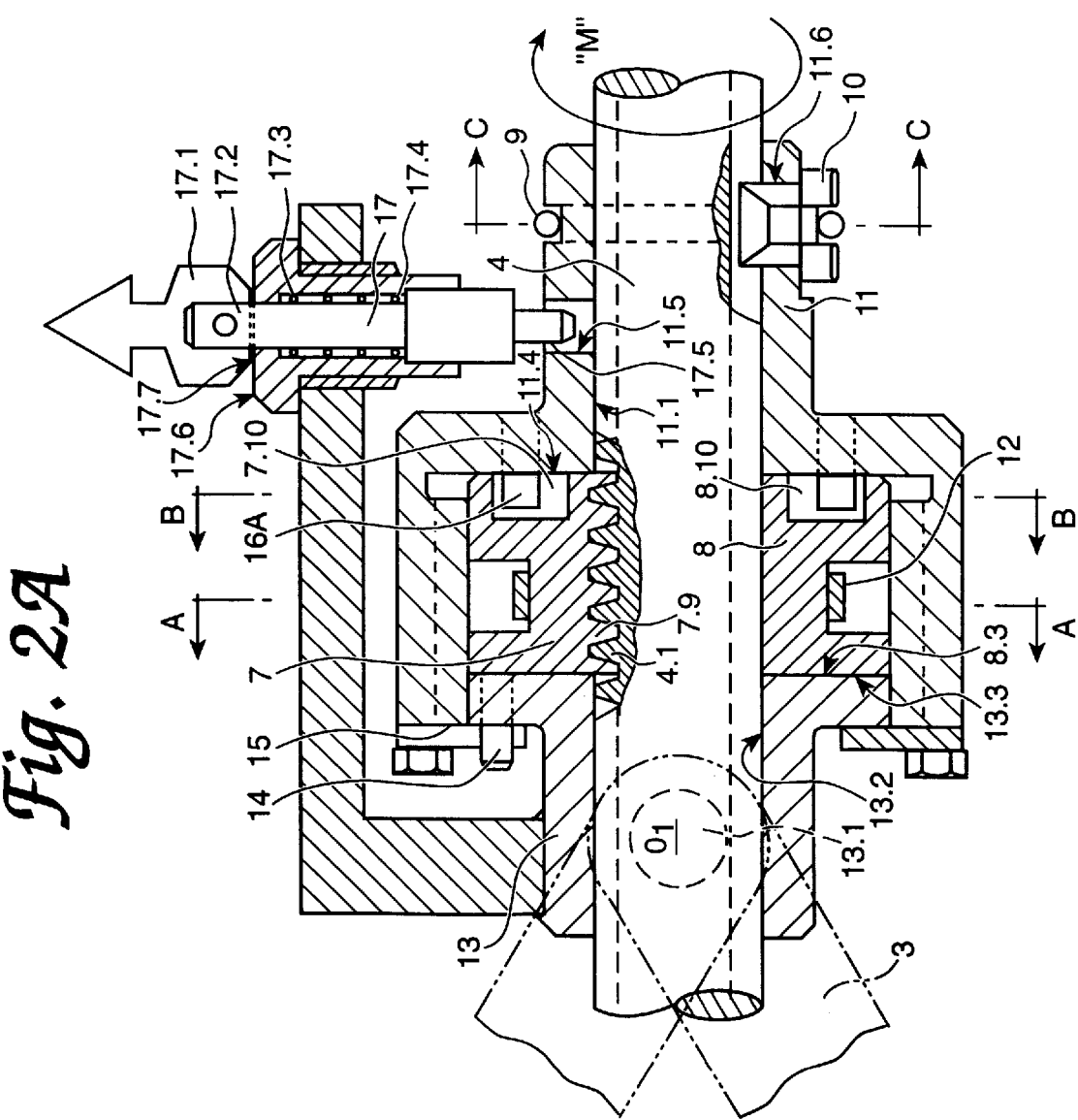

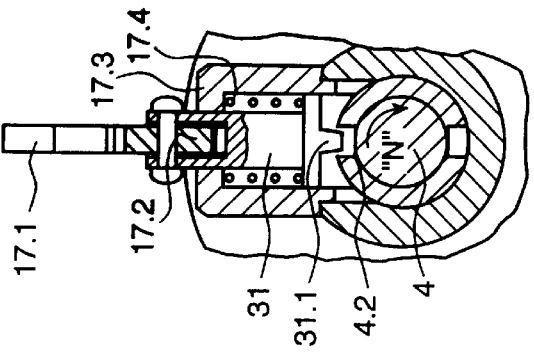
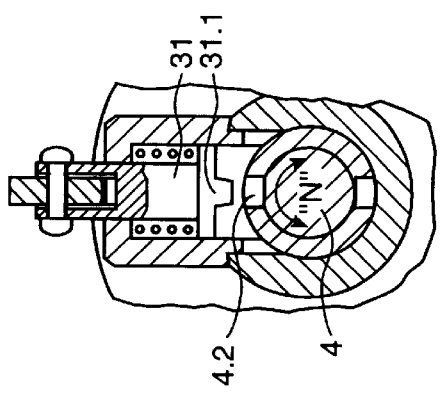
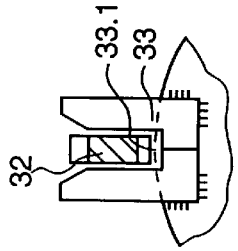
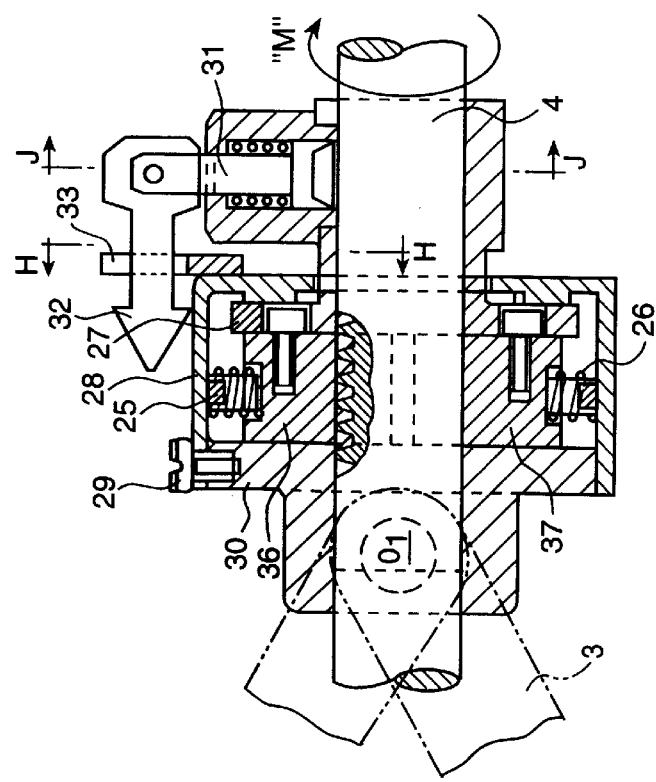

Fig. 11A
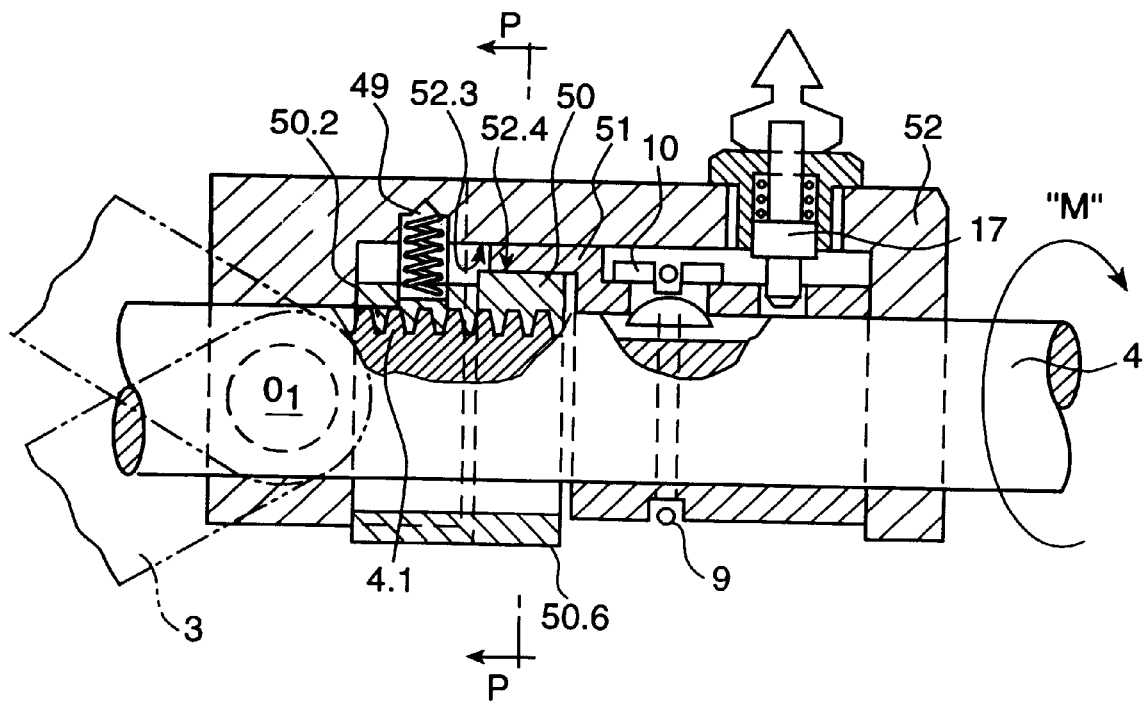
Fig. 11B
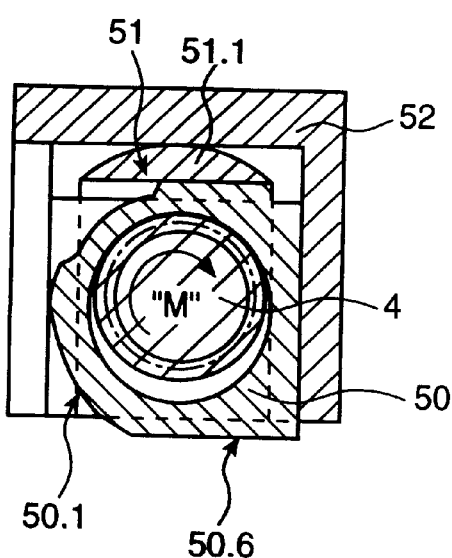
Fig. 11C

QUICKLY MOVABLE ELASTICALLY ENGAGING SCREW-AND-NUT MECHANISM

This application is a continuation-in-part of PCT international application No. PCT/CN95/00068 which has an international filing date of Aug. 18, 1995 which designated the United States, the entire contents of which are hereby incorporated by reference.

FIELD OF THE INVENTION

The invention relates to a quickly movable elastically and automatically engaging screw-and-nut mechanism (referred to as "F nut pair" in the following) which is a new type of screw-and-nut mechanism and can be used on the carriers such as a car screw jack, bench vice, architectural scaffold, sliding table of machine tool and the like, and other means that require using a screw-and-nut assembly as a kinematic pair of a drive that quickly passes over an idle stroke. Also it can be used as a "means for speedly adjusting distance and locating positions" which allows arbitrary adjustment and positioning. The key technique used is a mechanically program-controlled, elastically engaging, automatically opening and closing screw-and-nut pair of the invention, which allows the semi-nuts under the effect of the mechanically programmed and automatically controlled system to auto-matically and successively perform the following five predetermined mechanically program-controlled actions (referred to "5 steps for automatically opening and closing" in the following): (1) The thread peak elastically and automatically aligning with the,.thread valley; (2) the thread peak and the thread valley automatically and elastically engage with each other in "full thread depth"; (3) rigidly selflocking the completely engaged semi-nuts and screw; (4) releasing selflocking to wait for seperating; and (5) rigidly seperating the semi-nuts and the screw.

BACKGROUND ART

Many patents relate to quickly opening and closing screw-and-nut machanism with either the screw or the nut up-and-down typo system. Such patents include U.S. Pat. Nos. 4,834,355, 4,923,185, 5,282,392 and other related patents such as CN 2078210U, CN 1047466A, CN2065969U, CN2057131U, CN1065514A. In these patents, the engagement of thread peaks and thread valleys of the screw and nut is essentially achieved by means of a rigid operation actuating device in the form of a variety of cams, links etc. to directly and rigidly make forced engagement. Problems existed and included failure in engagement of the threads and the threads incapable to work normally. Thus there are two drawbacks: one of the drawbacks is a low percentage of the number of threads engaged relate to the total number of threads. The reason is evident. Since the thread peak of either a triangular thread or trapezoid thread both have a certain width, these thread peaks are likely to collide with each other and not to be engaged when they are engaged in a rigid manner. And the probability of this phenomena happening increases as the width of the thread peak increases. The other drawback is a low percentage of the number of threads engaged in "full thread depth" in the total number of threads. The full thread depth is the depth between the thread peak and thread valley of the semi-nut and screw which can be engaged. In a rigid manner, a complete engagement in "full thread depth" can be attained only when the center of thread peak and the center of thread valley of the semi-nuts and screw are just aligned with each other. It is evident that the probability is also certainly very low, so the most engagements of the threads are not engagement in "full thread depth". Although they are engaged, the engaging depth at every instance is not ideal. Sometimes it begins to work when the engagement of the internal and external threads have not yet reached the specified depth, which lowers loading capacity and reliability of the screw threads. Also in the prior art, there is a Patent CN 2139872Y, having an engaging means for its semi-nuts. Although the present employs a spring for elastically engaging, the disengaging of its semi-nuts is accomplished by another manual operating lever. This patented technique belongs to a technical field of rather primitive, manually operating opening and closing of a screw-and-nut pair without any mechanically programmed, automatically controlled system. It does not belong to the same technical field of the present invention and does not have the function of performing "5 steps for automatically opening and closing". In summary, by using the key technique "mechanically program-controlled, elastically engaging, automatically opening and closing a screw-and-nut pair", the present invention can perform "5 steps for automatically opening and closing", to thereby overcome the various drawbacks which exist in the abovementioned reference documents.

SUMMARY OF THE INVENTION

The invention provides a quickly movable elastically engaging screw-and-nut mechanism (referred to as "F nut pair" in the following) comprising: a screw, semi-nuts; a supporting seat; and an opening and closing device. There is provided one or more semi-nuts uniformly distributed around the cross-section of a screw which is supported by a supporting seat. The semi-nuts are located between the supporting seat and the up-and-down sleeve and are provided with an opening and closing means which can automatically rise or drop. The up-and-down sleeve is provided with an antishift means to prevent shifting along the axial direction of the screw. The supporting seat includes supporting arms (one or two), a supporting hole (one or two), a supporting body (including means connected to the carrier such as pivot axle $O_1$), an up-and-down guide member which is fitted with up-and-down sliding guideways of the semi-nuts, and a position limiting member. The screw passes through the supporting hole, the semi-nuts and the up-and-down means (such as up-and-down sleeve, including axially antishift means) in a movable type of engagement. For two or more semi-nuts, they should be arranged around the center of the screw. The semi-nuts have internal threads which extend less than a half of the periphery in addition to sliding guideways for guiding the up-and-down movement, as well as an actuative member to transmit the up-and-down force. The "mechanically program-controlled, automatically opening and closing device for the semi-nuts" (referred to as "automatic opening and closing device" in the following) which is used to control the automatic and synchronous opening and closing motion of the semi-nuts comprises an "elastically engaging actuating element" (such as spring) acting on th semi-nuts, a "rigid self-locking actuating element" for rigidly selflocking the semi-nuts, and a "seperating actuating device" (such as cam profile, link mechanism) for rigidly seperating the semi-nuts. The "automatic opening and closing device" further comprises a mechnically program-controlled motion assigning actuating element (such as up-and-down sleeve), an automatic, synchronous overload seperating device (such as pawl, spring hoop etc.) and an upward stroke limiting device, a safeguard device, and a speed changing device which permits the screw to advance or retract with either a quick or a slow speed.

By using a "mechanically program-controlled, elastically engaging, automatically opening and closing screw-and-nut pair", the invention has found a reliable, simple and practical embodiment/scheme of a mechanically programmed, automatically controlled system. The scheme can make the semi-nuts successively perform the "5 steps for automatically opening and closing" according to the predetermined motion procedure in an operating cycle period of one turn of the positive or inverse revolution of the screw. The concrete technical scheme of the invention is to use an elastic means to engage the internal threads of the nut and the external threads of the screw in a manner like a soft landing. A rigid self-locking actuating device is used for self-locking the nut after it has been engaged. When it is desired to operate in the inverse way to facilitate the seperation between the internal and external threads, a rigid automatic seperating device is used. The rigid and elastic technique are used in a combined manner, which ensures not only the percentage of threads engaged reaching 100% but also the percentage of threads engaged in full standard depth reaching 100%. At the same time, the screw-and-nut pair which is in engagement and under heavy load can ensure its reliability on self-locking.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 2A-2B are a main view of the first ambodiment of the "F nut pair", it has two semi-nuts, wherein an "elastically engaging actuating element" is a "retractable plate spring", a "rigid self-locking element" is an internal curved cam, and a "separating actuating device" is an end face cam pair which is provided on the end faces of the semi-nuts. In the figure, the screw 4 notates a clockwise direction (referred to as M direction in the following), where the internal and external threads are in an engaging state.

FIG. 8A is a main view of the third embodiment of the "F nut pair", wherein the "elastically engaging actuating element" is a compression spring, and the self-locking and seperating device are the same as FIG. 7A, but in this figure, the double speeds changing device is integral with the paw. When the screw is in the slow speed state, when the screw can rotate arbitraily in M or N direction, but it is in the self-locking state, the internal and external threads can not be seperated from each other.

FIG. 8B is the J—J sectional view of FIG. 8A, showing that the pawl is lifted away from the screw.

FIG. 8C is another J—J sectional view of FIG. 8A, showing that the pawl is lowered and inserted into the keyway of the screw 4.

FIG. 8D is the partial H—H sectional view of FIG. 8A.

FIG. 11A is a main view of the sixth embodiment of the "F nut pair", where it has only one semi-nut. The "elastically actuating element" is a compression spring, the "rigid self-locking element" is an up-and-down plate, and the "seperating actuating device" is a radial cam pair provided on the outer periphery of the semi-nut. In this figure, the screw rotates in the M direction, where the internal and external threads are in an engaging state.

FIG. 11B is one of the P—P sectional views of FIG. 11A, showing that when the screw 4 rotates in the M direction, the internal and external threads, are engaged elastically with each other, and are self-locked by the up-and-down plate.

FIG. 11C is the another P—P sectional view of FIG. 11A, showing that when the screw 4 rotates in the N direction, the internal and external threads separate from each other under the effect of the up-and-down plates of the cam pair.

PREFERRED EMBODIMENTS OF THE INVENTION

Figure 1:
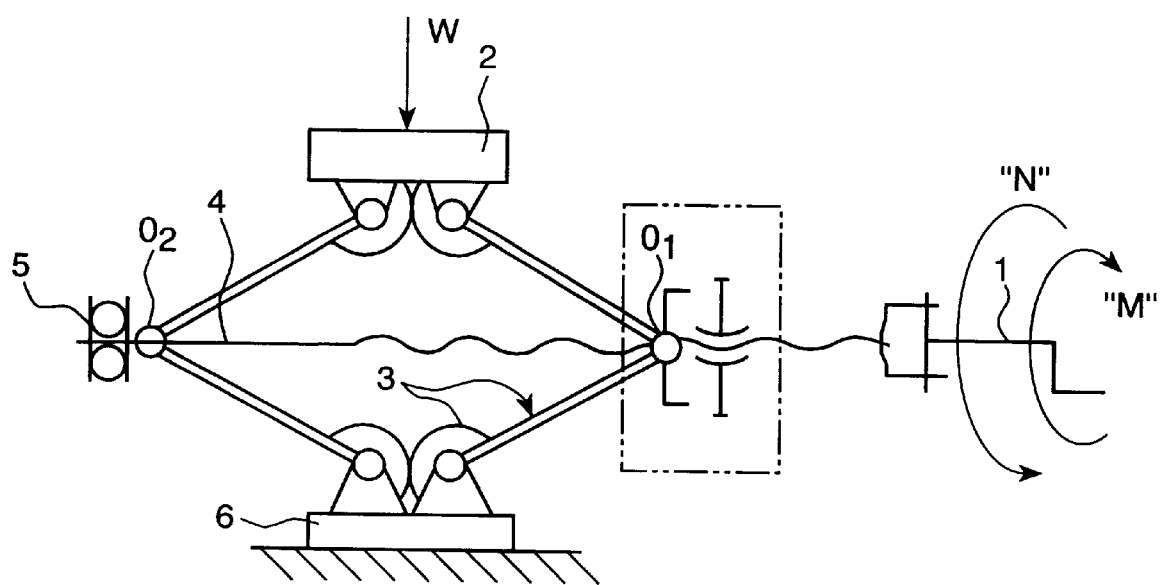
FIG. 1 is a schematic view illustrating the work principle of a car screw jack which employs the "F nut pair" of the invention and has the function to rise or drop with two speeds (quick and slow).

FIG. 2 is the first embodiment (embodiment A) of the invention. The carrier for use of the key part "F nut pair" is a screwjack used for replacing a tire of a car as shown in FIG. 1. The "F nut pair" is mounted on the pivot axle $O_1$ at right side of the screw jack.

The screw jack comprises a bottom seat 6, top support 2, four links with sector gears, left pivot axle $O_2$, right pivot axle $O_1$, plane bearing, screw 4 with handle 1, and "F nut pair" of the invention which is integral with the right pivot axle $O_1$. The left end of the screw 4 is connected with the pivot axle $O_2$ and its right end threaded part is matched with the "F nut pair". When operating, the screw 4 is rotated, by means of the "F nut pair", the distance between the left and right two pivot axles $O_2$ and $O_1$ is shortened or enlarged, and the top support lifts a car up or down through the link mechanism.

FIG. 2 is the main view of the "F nut pair" of the invention, wherein the screw 4 is rotated in the M direction with the internal and external threads being in the normal state of engagement. This embodiment has two semi-nuts. The features of its opening and closing actuating mechanism are: the elastically engaging actuating element of the semi-nut is a retractable type plate spring 12; the rigid self-locking element is an internal-currved type cam pair and the seperating actuating device is an end face cam pair provided at the end face of the semi-nut.

Figure 4A:
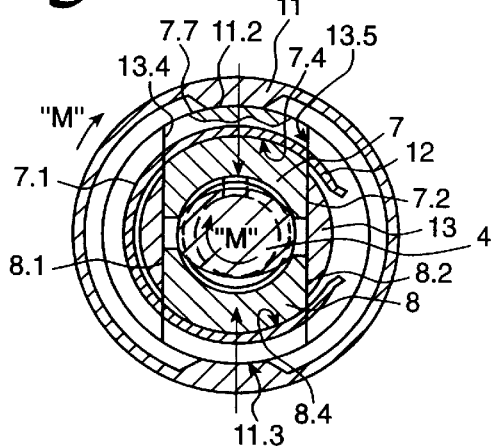
FIG. 4A is the A—A sectional view of FIG. 2A, showing that the screw 4 rotates in the M direction, the two semi-nuts make centripedal movement under the effect of retractable plate spring, and the internal and external threads are in an engaging state.
Figure 4B:
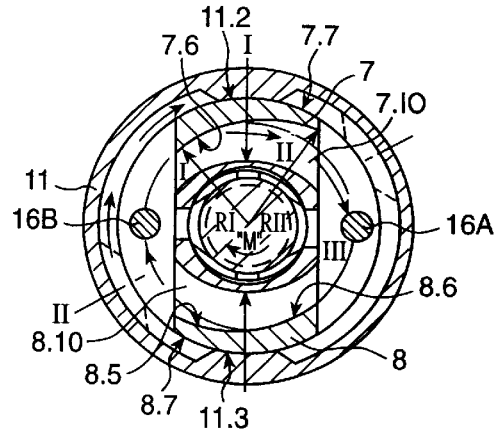
FIG. 4B is the B—B sectional view of FIG. 2, showing that after the semi-nuts have been engaged with the screw, the semi-nuts are self-locked by the internal curved cam profile.
Figure 5A:
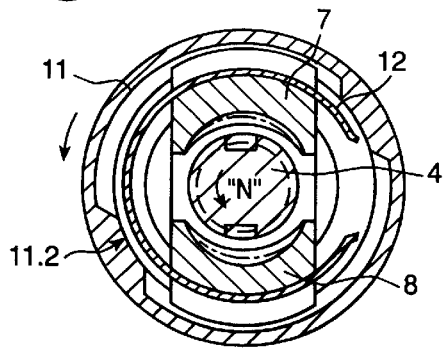
FIG. 5A is the D—D sectional view of FIG. 3, showing that the screw 4 rotates in the N direction, where the internal and external threads are in a seperating state.
Figure 5B:
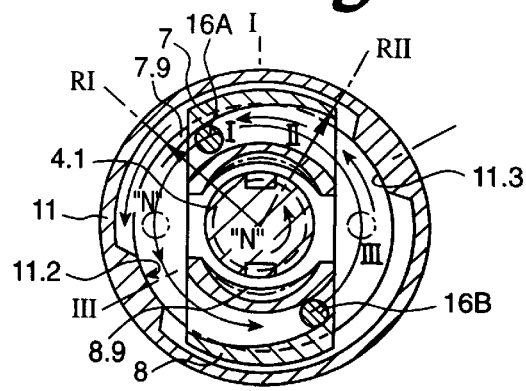
FIG. 5B is the E—E sectional view of FIG. 3, showing that the semi-nuts have been released from the self-locking position and the semi-nuts have a centrifugal seperating movement under the effect of the end face cam pair.
Figure 6A:
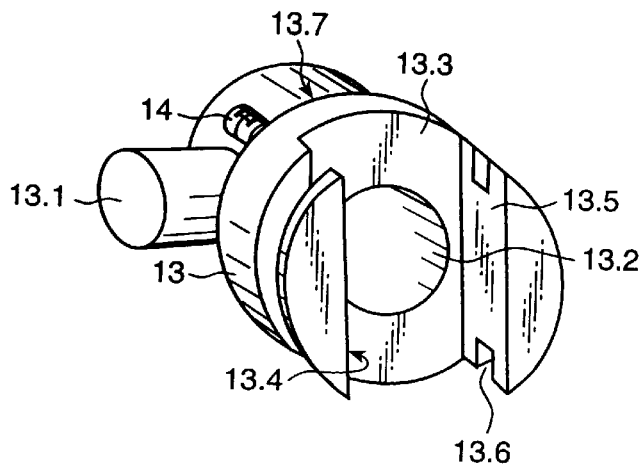
FIG. 6A is a perspective view of the supporting seat of FIG. 2A.
Figure 6B:
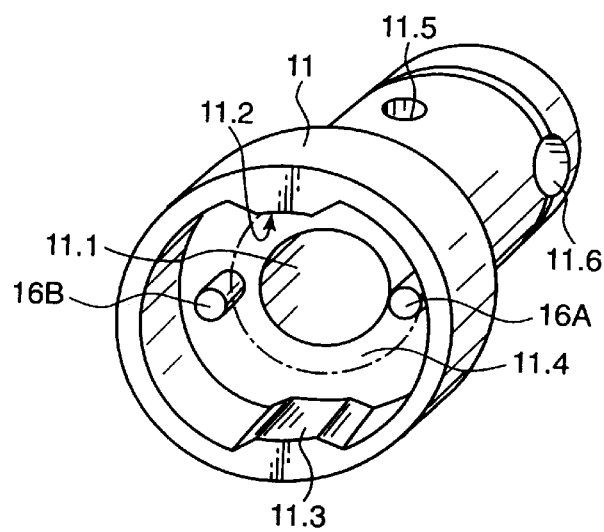
FIG. 6B is a perspective view of the up-and-down sleeve of FIG. 2A.
Figure 6C:
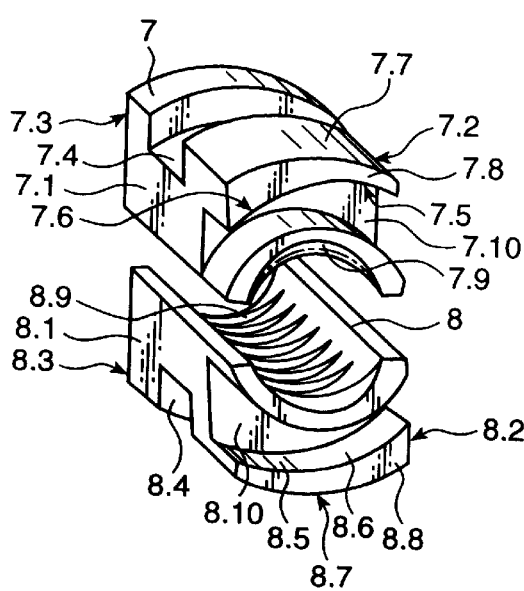
FIG. 6C is a perspective view of the upper and lower two semi-nuts of FIG. 2A.
Figure 6D:
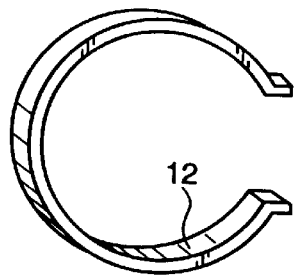
FIG. 6D is a perspective view of the retractable plate spring of FIG. 2A.

The concrete structure of this embodiment comprises supporting seat 13, two upper and lower semi-nuts 7 and 8, retractable plate spring 12, up-and-down sleeve 11, cam guide pin 16, pawl 10, spring hoop 9, limiting stop pin 14, clamp plate 15, speed changing device 17 and the screw 4. As the carrier of the "F nut pair" is a screw jack, so the supporting seat is to be connected to the pivot axle 13.1 (as FIG. 6-I). The screw 4 passes through supporting hole 13.2 and the inner hole 11.1 of the up-and-down sleeve, and cooperates with the semi-nuts and their "automatically opening and closing device." The front and rear two outer side faces 7.1, 7.2, 8.1, 8.2 of the two semi-nuts 7 and 8 are in movable fit with the inner side guideway faces 13.4, 13.5 of the supporting seat; and the left and right two end faces 7.3, 8.3 and 7.8, 8.8 are in movable fit with the right and guideway face 13.3 of the supporting seat and the left end guideway face 11.4 of the up-and-down sleeve respectively. As to the "separating actuating device" of the semi-nuts, this embodiment provides end face cam grooves 7.10 and 8.10 on the right end face of the semi-nuts 7 and 8, which engage respectively with cam guide pins 16A and 16B on the left end face 11.4 of the up-and-down sleeve 11 to form the end face cam pair, i.e. the seperating actuating device. The design features of cam profile of the above cam pair are as follows (take the upper semi-nut 7 as example, see FIG. 4B and FIG. 5B): Let the radii of the internal curved profile of the cam be maximum (RII) at the right conner (at position II) of the cam profile,. and be minimum (RI) at the left corner (at position I), the difference of the two radii is the amount to be moved outward by the semi-nut 7 when it is seperated, as shown in FIG. 5A. When the cam guide pin 16A rotates with the screw 4 and the up-and-down sleeve together in the N direction from position III, throught position II to position I, the internal threads 7.9 and 8.9 of the semi-nuts 7 and 8 seperate from the external threads 4.1 of the screw 4 at once. Of course, as the up-and-down sleeve 11 rotates in N direction, its self-locking internal curved cam profile also rotates in N direction from position I to position III for awaiting orders (see FIG. 5B). As to the elastically engaging actuating element of this embodiment, it is the retractable plate spring 12 rendering its slow and uniform centripedally retracting resilence to the semi-nuts softly through the curved faces 7.4 and 8.4 on the groove bottom of the semi-nuts. As to the rigid self-locking actuating element, it is the internal curved cam profiles 11.2 and 11.3 provided on the up-and-down sleeve 11. Its working principle can be discussed as follows (take the upper semi-nut 7 as example): When the up-and-down sleeve rotates in M direction, the cam guide pin 16A will move from position I→position II→position III, thus in the up-and-down guideway, the semi-nut 7 makes centripedal elastically engaging movement in a soft landing manner under the effect of plate spring until reaching the standard engaging depth which is specified by the thread form as shown in FIG. 4A. Meanwhile, the curved face 7.7 of the upper cam of the upper semi-nut 7 locates also at its lowest position, and the internal curved profile 11.2 of the cam on the up-and-down sleeve 11 has just rotated to the position I, as it makes engagement rigidly with the external curved cam profile 7.7 of the semi-nut, whereby allowing the semi-nut 7 hold with the screw without seperation even when the semi-nut 7 is subjected to heavy load during operation, and the aim of self-locking attained.

Figure 3:
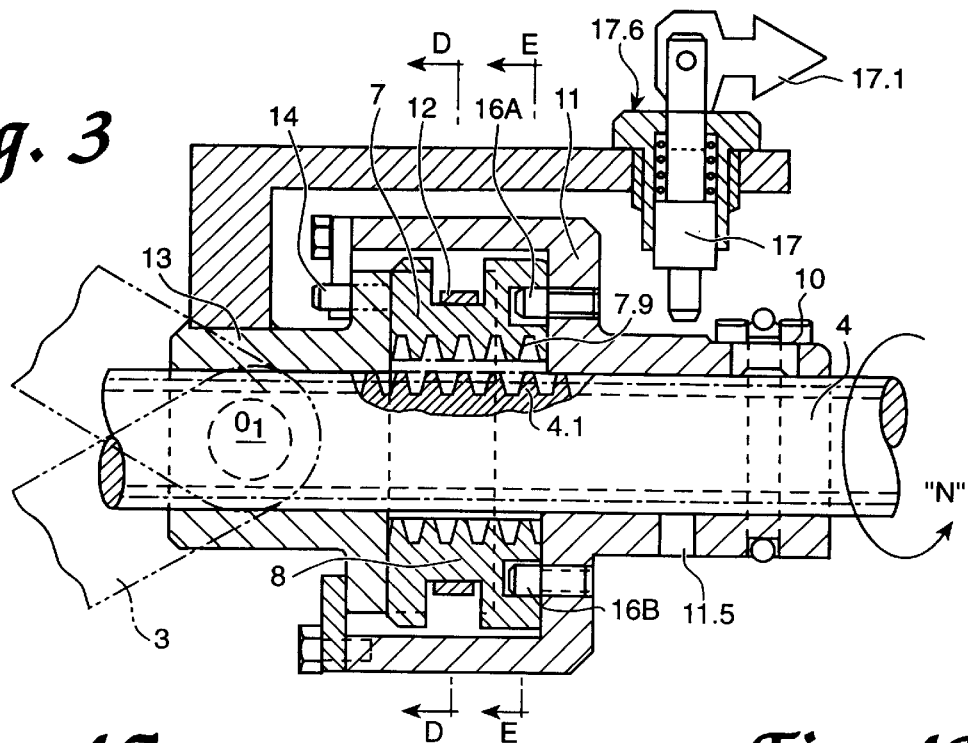
FIG. 3 is a similar main view as FIG. 2 but the screw 4 rotates counterclockwise (referred to as N direction in the following), where the internal and external threads are in separating state.

The torque to rotate the above up-and-down sleeve either in M or in N direction is generated by the screw 4, where the torque is transmitted to the up-and-down sleeve through an "automatic synchronous overload seperating device" mounted on the up-and-down sleeve. The "overload seperating device" comprises a pawl 10 which is mounted in a radial hole 11.6 of the up-and-down sleeve (in sliding fit), a spring hoop 9 and a keyway 4.2 on the screw 4. At the lower end of the pawl there are two ramps 10.1 whese end part could be pushed by the resilence of the spring hoop to press against the "outer periphery" of the screw 4 or fall into the keyway of the screw. When the screw rotates in M direction, the side edges 4.3 of the keyway 4.2 of the screw touch with the ramps of pawl 10.1, push the pawl and up-and-down sleeve and rotate synchronously with the up-and-down sleeve in M direction, then each actuating device on the up-and-down sleeve forces the semi-nuts 7 and 8 to make "centripedal engaging movement" until the limiting stopper 15 on the up-and-down sleeve touches with the stop pin 14 on the supporting seat 13 and the rotation is stopped. Meanwhile the screw 4 still rotates in M direction so as the force exerted by the side edge 4.3 of the keyway on the pawl ramp 10.1 is increased till the upward axial component of the force is greater than the downward pressure which is exerted by the spring hoop 9 on the pawl, the ramp of pawl would be squeezed out apart form the keyway 4.3, i.e. seperating under overload, and the screw could still ratate in M direction to lift the car. On the contary, when the screw rotates in N direction, the torque would be transmitted in the same way to the up-and-down sleeve 11 through the pawl 10, cause the up-and-down sleeve rotate with the screw 4, and through each actuating device cause the semi-nut make "centrifugal movement" to force the internal and external threads to the seperated (see FIG. 3), then the quick drop of the screw jack is realized. If it is desired that the falling speed is to be slowed, a locking device 17 could be mounted on the supporting seat 13, this device comprises an insterting pin 17.5, a spring 17.4, a socket for inserting pin 17.3, a pin axle 17.2 and an eccentic handle 17.1, wherein the front and of the inserting pin 17 is an inserting pin tip 17.5, which is just aligned with the locking hole 11.5 in the up-and-down sleeve 11. The working principle of the locking device is as follows: when it is desired that the screw should have the functions of slow retract and slow advance (i.e. the screw jack can rise or drop in a slow way); at first, operate the handle, let the screw 4 rotate in M direction, which causes the internal and external threads to be in engagement, then let the arrow of the eccentric handle be placed in vertical direction (as shown in FIG. 2A), meanwhile the eccentric handle 17.1 is at the position of short axis (i.e. the bottom face 17.7 of the eccentric handle 17.1 is in contact with the upper end face 17.6 of the spring seat 17.3), the inserting pin 17 could be inserted in the locking hole 11.5, and the up-and-down sleeve 11 is fixed to be incapable of rotation, thereby the internal threads of the semi-nuts 7, 8 and the external threads of the screw could be kept in engagement, this is the same as conventional screw drive mechanism, and the original functions of slow advance and alow retract are completely retained. When it is desired that the screw should have the functions of quick advance and quick retract, the eccentric handle 17.1 could be placed with its arrow in horizontal position, whereby the eccentric handle 17.1 is at the position of long axis (i.e. the side face of the eccentric handle 17.1 is in contact with the upper end face 17.6 of the spring seat 17.3). Meanwhile the inserting pin tip 17.5 retracts from the locking hole 11.5 of the up-and-down sleeve 11 and the up-and-down sleeve 11 could be brought by the screw and pawl to rotate in N direction. Thus the internal threads of the semi-nuts could be seperated from the external threads of the screw, to thereby cause the screw to have the function of speedly passing through an idle stroke. If the carrier to be applied is a screw jack, then the quick rise or drop of that screw jack can be attained.

Figure 7A:
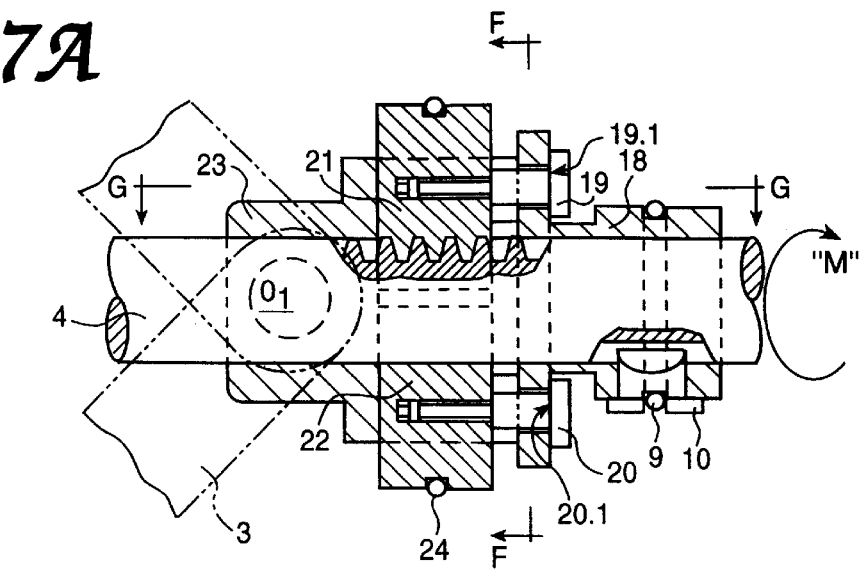
FIG. 7A is a main view of the second embodiment of the "F nut pair", wherein "elastically engaging actuating element" is a spring steel wire, the "rigid self-locking element" and the "seperating actuating element" are disc-shape cam profiles which are provided on the up-and-down sleeve. In this figure, the screw 4 rotates in M direction, the internal and external threads are in engaging state.
Figure 7B:
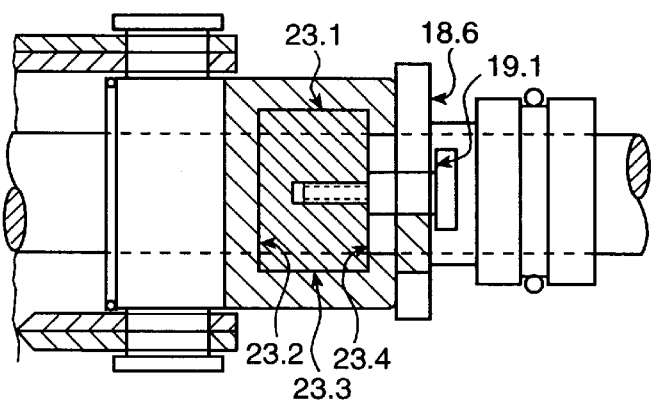
FIG. 7B is the F—F sectional view of FIG. 7A.
Figure 7C:
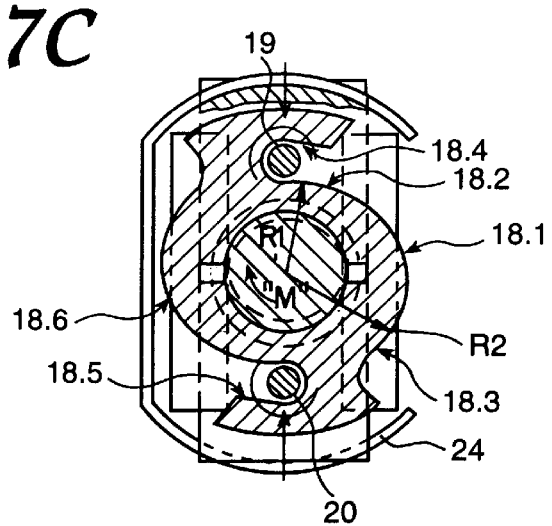
FIG. 7C is the G—G sectional view of FIG. 7A.

FIG. 7A shows the main view of the second embodiment of the "F nut pair". In this embodiment, the equivalent transformation theory M of relative motion is applied, only the cam profiles of self-locking and separating actuating elements in FIG. 2 of the first embodiment are transferred to the same cam on the up-and-down sleeve, while others are the same. The concrete structure is as follows: The cam guide pins 19 and 20 are mounted respectively on the right side end face of the semi-nuts 21 and 22, which are restrained to make up-and-down as well as opening and closing movements in a frame shape up-and-down guideway (such as that composed of 4 faces 23.1–23.4, see FIG. 7B, or other shapes as dovetail, cylinder etc.) of the supporting seat 23. The elastically engaging actuating element of the two semi-nuts is a spring hoop 24. The post-engagement "rigid self-locking elements" are the internal curved faces 18.4 and 18.5 on the up-and-down sleeve 18 which hook up the cam guide pins 19, 20 to selflock (see FIG. 7C), the "seperating actuating device" is undertaken also by an up-and-down cam profile 18.1 provided on the same up-and-down sleeve, the cam profile 18.1 with its minimum radius $R_1$ at 18.2 and maximum radius $R_2$ at 18.3 cooperates with the cam guide pins 19, 20 to form cam pairs for making the seperating motion. As to the restraint of axial shift of the up-and-down sleeve 18, it is accomplihed by providing bosses 19.1 and 20.1 to the end face of cam guide pins 19, 20 for resisting against the right side face 18.6 of the cam 18. Alternatively, it can be accomplished by mounting a large washer with cylindricaly protruded edge or a housing to the right side end face 18.6 of the up-and-down cam 18 and securing to the supporting seat 23 (such as by welding or connecting with screw etc.) as shown in FIG. 8A. As to the working procedure of engaging, self-locking and seperating, since it is completely the same as the first embodiment both in operating process and in working principle, it will not be further discussed.

FIG. 8A is the main view of the third embodiment of the "F nut pair". The structural form of some mechanical elements of the above second embodiment in FIG. 7A has only made some equivalent transformation according to the equivalent transformation theorem, such as elastically engaging element is replaced by two compression springs 25, 26, while the axially anti-shift means of the up-and-down sleeve is replaced by a closed dustproof housing 28 which is connected to the supporting seat 30 by screw 29. Besides, the inserting pin tip 17.5 and the pawl 10 of speed changing means in FIG. 2 has combined into a new pawl rod 31. Other structures are the same as the second embodiment, so there will not be discussed further. But one point may be mentioned that these equivalent transformation of the third embodiment not only improve manufacturability but also also enhance its reliability, especially the new speed changing means 31 facilitates speed changing operation. The speed changing process is as follows: (1) changing into slow speed: let the screw 4 rotate in M direction, and the two semi-nuts 36, 37 are in engagement with the screw 4.

Meanwhile, rotate the eccentric handle 32 to the horizontal position, and insert it into a positioning slot 33.1 of the positioning plate 33, as shown in FIG. 8B and 8D, whereby the lower pawl working part 31.1 of the pawl rod 31 has been lifted apart from the keyway 4.2 of the screw 4 by the eccentric handle 32. The the up-and-down sleeve 27 is also fixed by the handle 32 such that the former cannot rotate further, so the two semi-nuts and the screw are always forced into mesh. This is the same as conventional nut-screw pair, so it can only work at slow speed. (2) Changing into quick speed: the only thing to do is to lift the handle 32 (apart from the positioning slot) as shown in FIG. 8C, whereby the pawl is released. The pawl part 31.1 can enter into the keyway 4.2 of the screw, at the time the working condition is the same as FIG. 3, and it requires only to rotate the screw 4 in N direction, where the two semi-nuts 36, 37 will soon be seperated from each other.

Figure 9A:
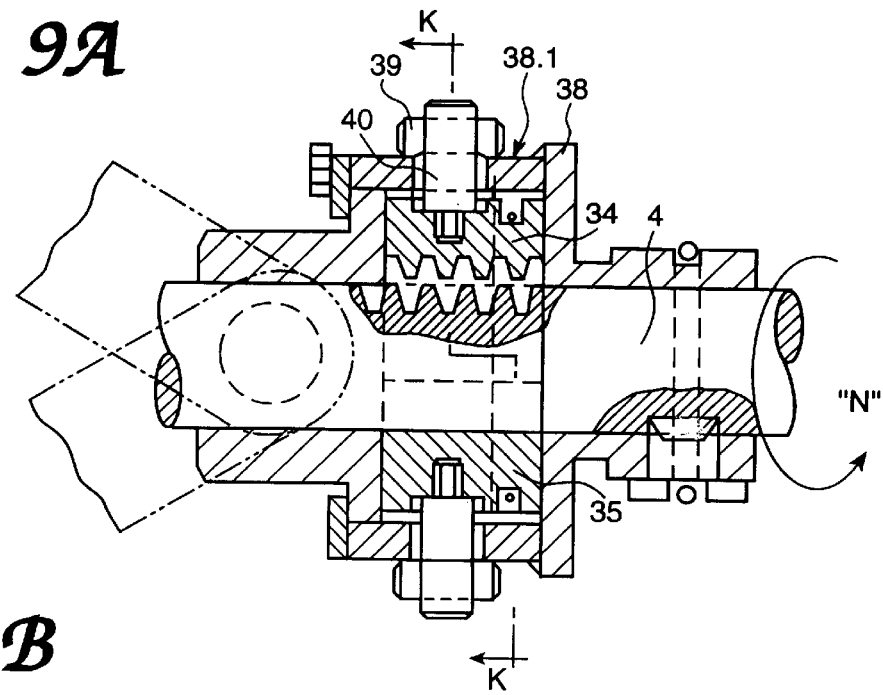
FIG. 9A is a main view of the fourth embodiment of the "F nut pair", wherein the "elastically engaging element" is a compression spring, a "rigid self-locking element" is an internal curved cam pair, and a "separating actuating device" is an external curved cam pair. In this figure, the screw 4 rotates in the N direction, where the internal and external threads are in separating state.
Figure 9B:
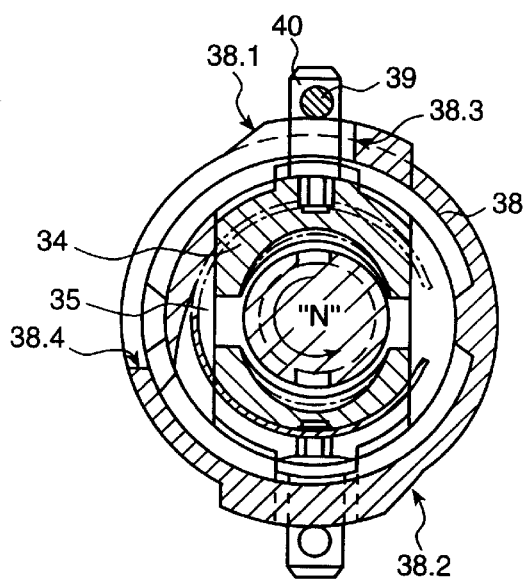
FIG. 9B is the K—K sectional view of FIG. 9A.

FIG. 9A is the fourth embodiment of the invention, whose "opening and closing actuating device" is derived on the basis of FIG. 2A. The endface cam profiles 7.6 and 8.6 (see FIG. 4B) which undertake the semi-nuts seperating actuating device have been transferred to the outer cylindrical surface of the up-and-down sleeve 38 in FIG. 9A as shown at 38.1 and 38.2, and the cam guide pins 39 which match with the cam profiles are connected with the semi-nuts 34 through link rods 40. The ends of curved grooves 38.3 and 38.4 provided on the up-and-down sleeve 38 are used as a position limiting means for the rotation of the up-and-down sleeve. When said ends collide with the link rods 40, the rotation is limited. Others such as self locking element, elastically engaging element and their operating process is the same as FIG. 2A, and it requires no further discussion.

Figure 10A:
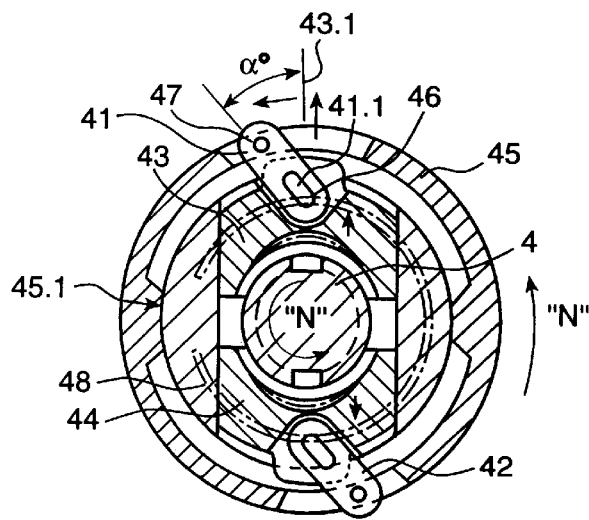
FIGS. 10A–10B are a main view of the fifth embodiment of the "F nut pair", these figures are all the same as FIG. 9B except for the use of a link machanism as "seperating actuating device" which is different from FIG. 9B. In these figures, the screw 4 rotates in the N direction, where the internal and external threads are in seperating state.
Figure 10B:
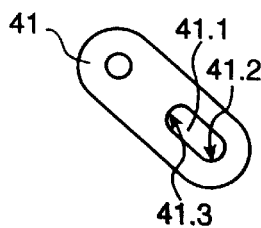

FIGS. 10A, 10B, 10C are the fifth embodiment of the invention which is derived on the basis of FIG. 2 only by changing the two cam profiles 8.5, 8.6, 7.5, 7.6 into two link plates 41 and 42 as in FIG. 10A for the use of seperating actuating element, and eliminates the cam guide pin 16A, 16B on the up-and-down sleeve 13 in FIG. 2. The other such as "elastically engaging actuating element" and "rigid selflocking element" are essentially identical. As to how the two link plates 41 and 42 cause the semi-nut rigidly separating, the seperating mechanism is as follows: take the opening and closing of the upper semi-nut 43 as an example. There are two pivot pins 47 and 46 inserted into the link plate 41, wherein 47 is provided on the up-and down sleeve 44, 45 is provided on the semi-nut 43, and the pivot pin hole of the link plate 41 which matches with the pivot pin 46 is an oblong groove hold 41.1. The operating process is as follows: when the up-and-down sleeve 45 rotates with the pivot pin 47 in N direction, owing to the fact that the lower end arc 41.2 of the oblong groove hole 41.4 of the link plate 41 comes into contact with the pivot pin 46, which will bring the semi-nut 43 move along the axis 43.1 to separate away. When the up-and-down sleeve rotates in M direction, owing to the fact there is a corresponding space in the upper part of the oblong groove hole 41.1 of the link plate, so that the elastically engaging movement of the semi-nut 43 caused by the spring 48 and the selflocking of the semi-nut 43 caused by the selflocking cam profile 45.1, both are not kindered. By utilizing the principle of selflocking at dead angle, i.e. the link 47 cam be selflocked when the transmitting angle $\alpha=0°$, the semi-nuts also can be selflocked and the selflocking cam profile can be eliminated, where when $\alpha=0°$, the upper end arc 41.3 of the elongated groove hole 41.1 is made to just contact with the pivot pin 46 of the engaged semi-nuts and the position is present by stop block.

Figure 12A:
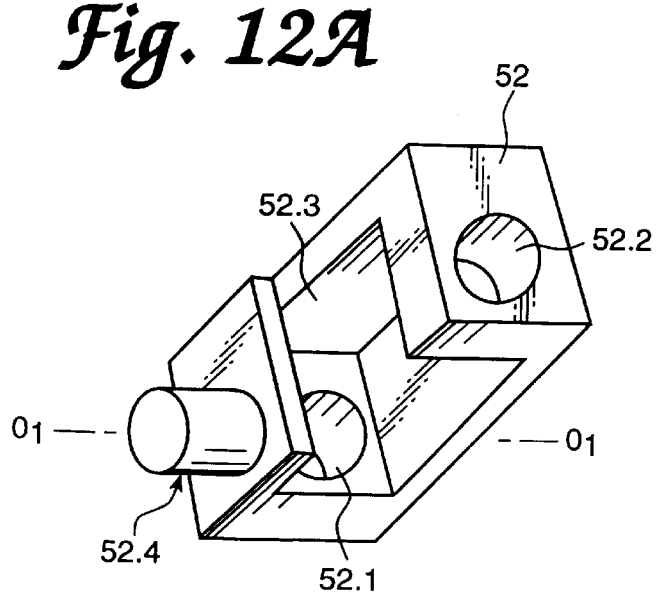
FIG. 12A is a perspective view of the supporting seat of FIG. 11A.
Figure 12B:
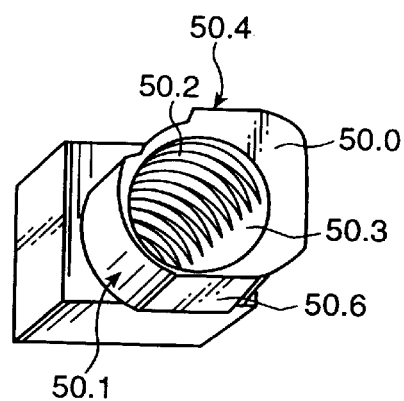
FIG. 12B is a perspective view of the semi-nut of FIG. 11A.
Figure 12C:
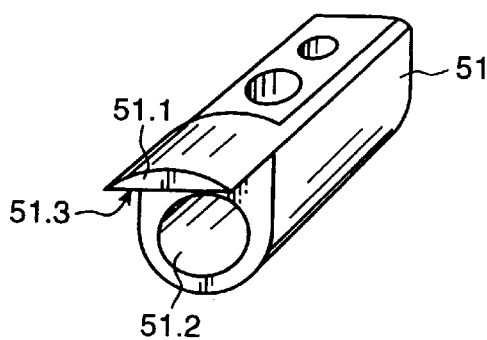
FIG. 12C is a perspective view of the up-and-down sleeve of FIG. 11A.
Figure 12D:
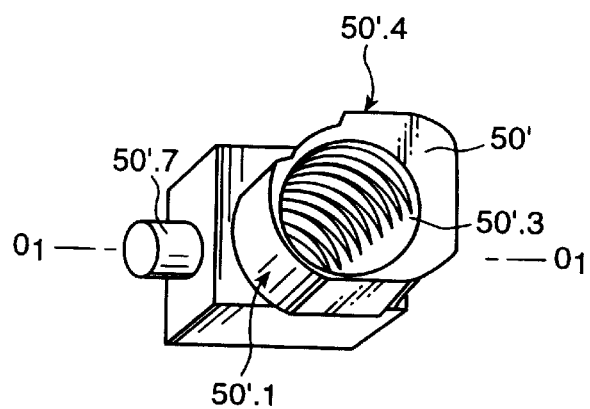
FIG. 12D is a perspective view of a semi-nut with a pivot axle $O_1$). The pivot axle in FIG. 11A is connected with the carrier (screw jack). The pivot axle is modified to be provided derived from semi-nut through an equivalent transformation.

FIGS. 11A, 11B, 11C are the sixth embodiment of the invention which is characterized in that there is only one semi-nut 50. In this embodiment, the "elastically engaging actuating element" is a compression spring 49, the "rigid selflocking actuating element" is an up-and-down plate 51.1 on the up-and-down sleeve 51, and the seperating actuating device is a radial cam profile face 50.1 provided on the outer periphery of the semi-nut 50. When the screw rotates in M direction, the internal and external threads are in mesh. The concrete structure is as follows: The semi-nut 50 has its internal threads 50.2 less than a half of the periphery, a plain hole 50.3 with diameter greater than that of the screw 4, and a drop portion of cam profile 50.1 on its outer periphery. The screw 4 passes successively through left end hole 52.1 of the supporting frame 52, plain hole 50.3 of the semi-nut, hole 51.2 of the up-and-down sleeve, and right end hole 52.2 of the supporting frame. The "elastically engaging actuating element" for the semi-nut 50 is a compression spring 49. When the internal and external threads are brought in engagement, the up-and-down plate 51.1 on the up-and-down sleeve 51 rotates after the screw 4 and the up-and-down sleeve 51 and comes to the upmost position, where it is inserted in a sliding fit between an upper top face 50.4 on the outer periphery of the semi-nut 50 and an upper bottom face 52.3 of the inner cavity of the supporting frame 52, thereby achieving rigid selflocking. When the screw 4 rotates in N direction (see FIG. 11C), the up-and-down sleeve 51 is brought to rotate together through the pawl 10, and the cam pair compased by the inner side face 51.3 of the up-and-down plate and the cam profile 50.1 on the outer periphery of the semi-nut 50 forces the semi-nut 50 upward, thus to separate the internal and external threads 50.3 and 4.1, until the inner side face 51.3 of the up-and-down plate collides with the lower plane 50.6 of the semi-nut 50. The above device has many ways to carry on equivalent transformation, such as the cam profile can be provided on the inner side face 51.3 of the up-and-down plate 51.1 of the up-and-down sleeve; again, the pivot axle $O_1$ joined with the carrier (screw jack) can be transferred to the semi-nut, as shown in FIG. 12D.

Figure 13:
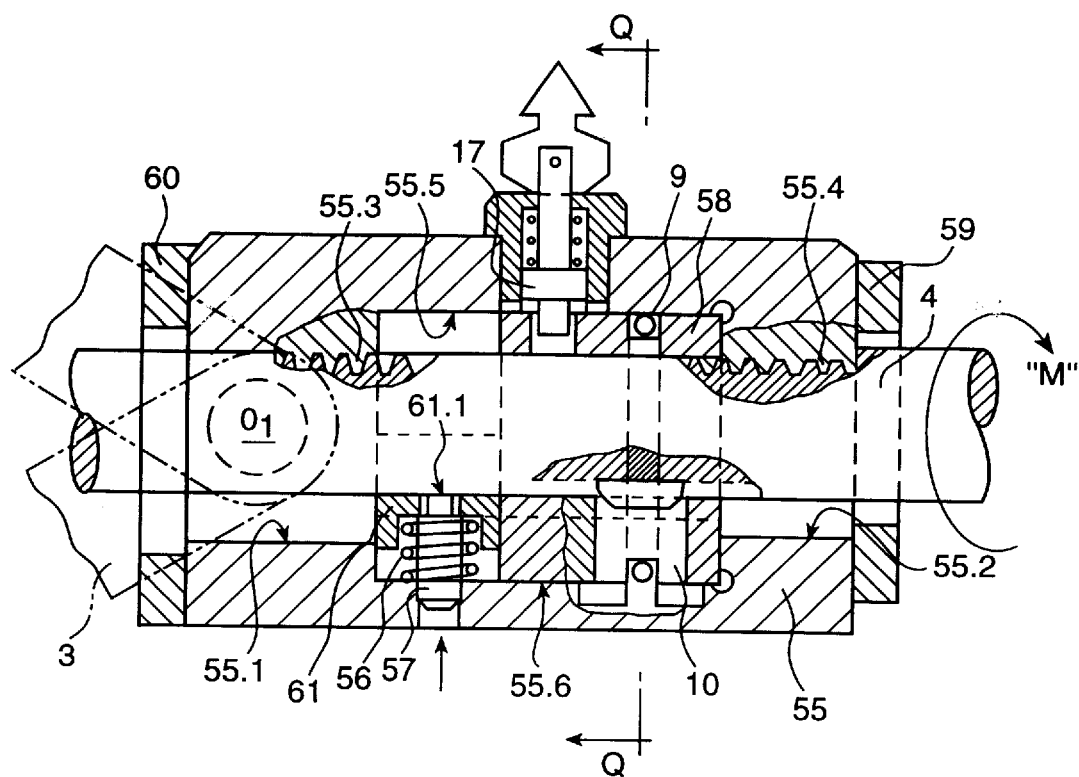
FIG. 13 is the seventh embodiment of the "F nut pair", which is on the FIG. 11A. The internal threads are provided in the supporting seat. The "elastically engaging element" is a compression spring, white the self-locking and seperating device is an eccentric cam.

FIG. 13A is the seventh embodiment of the invention, which is derived on the basis of FIG. 11A by transferring the internal threads into the supporting seat. It is characterized in that the supporting seat is a frame with a rectangular opening at its center. Internal threads 55.3, 55.4 which are less than a half of the periphery and plain holes 55.1, 55.2 with diameter greater than that of the screw 4 are provided in the left and right two side walls of the frame of supporting seat 55. There are further mounted guide groove means 59, 60 (it can be mounted also on the carrier) which allow the screw 4 to move in up-and-down direction only. And an eccentric cam sleeve is mounted in movable fit between the upper and lower faces of the rectangular opening of supporting seat 55. On the eccentric cam sleeve, there retains only the drop portion of cam profile (rise portion of cam profile is omitted to avoid interferring with the engaging action of the compression spring 56). The screw 4 successively passes through the respective holes according to FIG. 13A. In this embodiment, the "elastically engaging actuating element" is composed of a guided positioning rod 57, a compression spring 56 and a half circular curved cushion which has a half circular arc 61.1 conforming to the outer circumference of the screw, whose function is to transmit the compression force of the spring to the up-and-down moving screw 4. The selflocking and seperating actuating devices are realized by an overload seperating means (as pawl 10) and a cam pair which is composed of an eccentric cam sleeve and the upper and lower parallel planes 55.5 and 55.6 of the rectangular opening of supporting seat 55.

Figure 14:
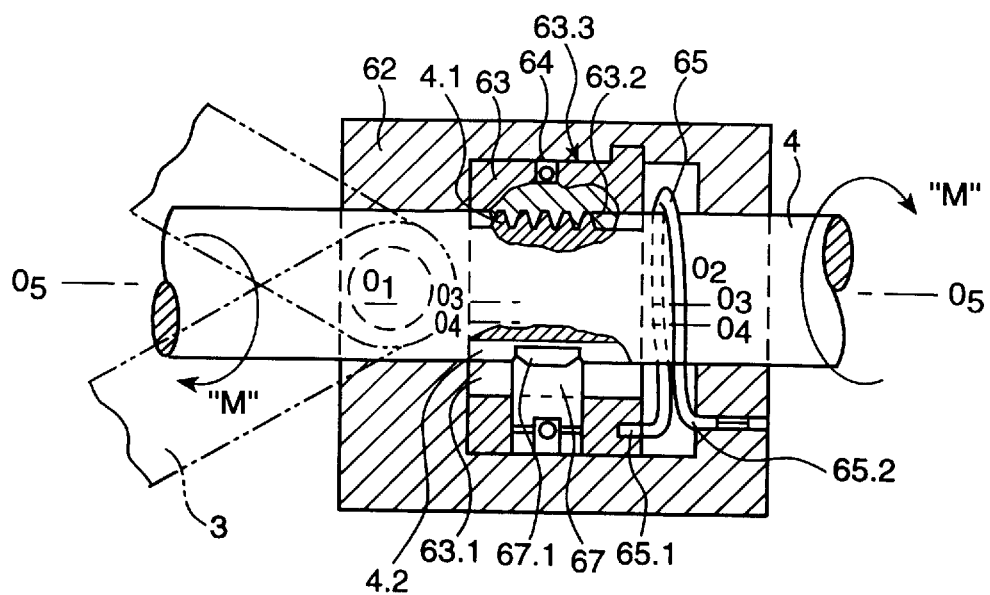
FIG. 14 is the eighth embodiment of the "F nut pair", which is derived from FIG. 13. The internal threads are provided in the eccentric cam, while the "elastically engaging element" is a torsion spring.

FIG. 14A is the eighth embodiment of the invention which is a combination of FIG. 11A and FIG. 13A. The internal threads are directly provided in the curved face of inner cavity of the eccentric cam sleeve 63, the structure of said inner cavity 63.1 is the same as the inner cavity of the semi-nut 50 in FIG. 11A. The outer structure of the eccentric cam sleeve 63 and the rectangular opening of the supporting seat 62 are also essentially the same as FIG. 13A. This embodiment is characterized in that, the internal threads 63.2 of the eccentric cam sleeve 63 and the external threads 4.1 of the screw 4 are engaged along a direction tangent to the outer circumference of the screw (while in all the previous embodiments, the engagement proceeds along a radial direction), so the "elastically engaging actuating element" used is a torsion spring, whose one end 65.1 is connected with the eccentric cam sleeve 63 and the other end 65.2 is connected with the supporting seat 62. Pawl 67 used as overload separating, means is directly provided on the eccantric cam sleeve 63.

Summarizing the above, for the "F nut pair" of the invention, many equivalent mechanisms can be used to replace these embodiments. For instance, an Archimede's spiral and face threads commonly used in the three-jaw automatically centering chuck of a lathe can be used to replace the end face cam mechanism in FIG. 2A; again, the number of semi-nut can be one or two, or more than two. All these are within the scope of the invention.

With respect to the "automatic, synchronous overload seperating device" used in the invention, besides the overload separating device of FIG. 2A which is composed of a pawl 10 and a spring hoop 9, there are a great many of other equivalent overload seperating devices. As to the form, it may be of single direction or of double direction, as to the drive manner, it may be electro-magnetic, hydraulic or pneumatic, as to the overload separating element, various elements such as pawl (of single or double direction), teeth, ball, guide pillar, friction cone (disc, plate, block, cushion) and various elastic elements (such as spring, elastically expandable loop or ring, expandable sleeve) can be used. In the following, some of the equivalent overload separating devices derived from FIG. 2 are listed.

Figure 15A:
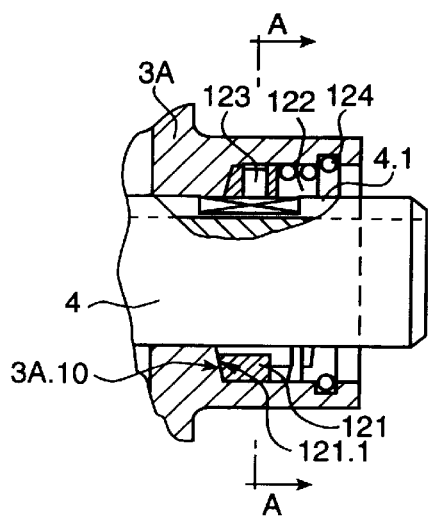
FIG. 15A is a partial main view of an overload seperating device of the semi-nut opening and closing mechanism wherein the device is of an end face friction cone type.
Figure 15B:
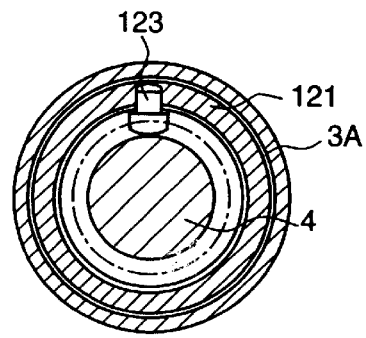
FIG. 15B is the A—A sectional view of FIG. 15A.

FIG. 15A, 15B show a friction overload separating device using a friction ring(or friction cone). Its working principle is as follows: A friction ring (cone) 121 is mounted in an up-and-down sleeve 3A, and slidably encloses the outer circumference of the screw 4. Friction face (cone) 121 tightly presses against the right friction face (cone) 3A.10 of the up-and-down sleeve 3A under the effect of the compression spring 122, friction ring (cone) 121 is connected to the screw 4 through a guide key 123. When the screw 4 rotates, its driving torque is transmitted through keyway 4.1, guide key 123, friction face of friction ring (cone) 121.1 to the up-and-down sleeve 3A which is brought to rotate together, until it stops when colliding with an upward stroke limiting means, but the screw will continue to rotate. Meanwhile this friction pair is overloaded and slides over each other without hindering the rotation of the screw, and the screw can achieve its predetermined job. The above stated contact faces 121.1 and 3A.10 of the friction ring (cone) can be replaced by a pair of teeth which can slide over each other under the effect of a compression spring 122 when overload occurs. Of course the amount of compression deformation of the compression spring must be greater than the depth that the teeth would be inserted in.

Figure 16A:
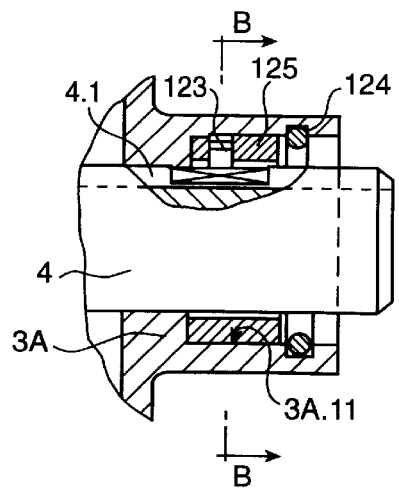
FIG. 16A is a partial main view of an overload seperating device of the semi-nut opening and closing mechanism wherein the device is of outward expandable friction ring type.
Figure 16B:
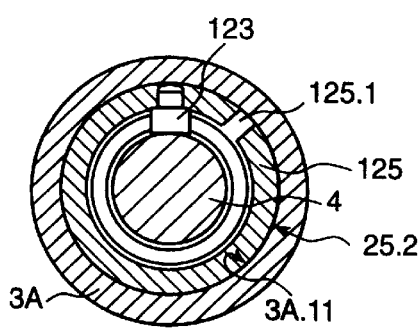
FIG. 16B is one of the B—B sectional views of FIG. 16A, showing the structure of an outerward expandable friction ring.

FIGS. 16A and 16B is an overload separating device of an expandable ring with its outer circumference as a friction surface. This embodiment uses an outer circumference friction expandable ring 125 in FIG. 16A to replace the friction ring 121 and compression spring 122, the expandable ring is still kept by a check ring 124, and there is an axial open slot 125.1 provided on the cylindrical body of the expandable ring 125. When the expandable ring is in the free state, its outside diameter 125.2 is greater than the inside diameter of inner hole 3A.11 of the up-and-down sleeve 3A. When assembling, the open slot 125.1 is forced to contract, it releases after the expandable ring is inserted into the inner hole 3A.11, thus by resilence the outer circumference 125.2 of the expandable ring 125 expands and sticks on the inner wall of the inner hole 3A.11 of the up-and-down sleeve, and results a certain amount of frictional force. The inside diameter of the expandable ring is slightly greater than the outside diameter of the screw, and the former is connected to the latter through a guide key 123. Its operating process is the same as the type of friction ring in FIG. 15A, the only difference is that the friction surface which can slide over at overload is transferred from the end face (or cone face) to the outer circumference of the expandable ring.

Figure 16C:
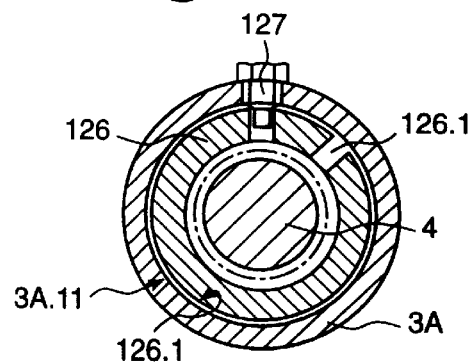
FIG. 16C is the another B—B sectional view of FIG. 11A, showing the structure of an inward expandable friction ring.

FIG. 16C is an overload seperating device of the type of an expandable ring with its inner hole as friction surface. Its working principle is essentially the same as FIG. 16B. Its expandable ring 126 has also an axial open slot 126.1. When in free state, the inside diameter of its inner hole is slightly smaller than the outside diameter 4.9 of the screw 4. After the screw is inserted in the inner hole, by resilence the inner hole embraces around the outer periphery of the cylinder of the screw 4 and results in a certain amount of frictional force (there is no keyway on the screw). The outside diameter of the inwardly expandable ring 126 is slightly smaller than the inside diameter of the inner hole of the up-and-down sleeve 3A, the driving torque of the screw is transmitted through a transmitting pin 127 to the up-and-down sleeve 3A. The operating process is the same as FIG. 16B, but that the friction surface which can slide at overload is directly undertaken by the friction surface lying between the outer circumference of the screw 4 and the inner hole of the expandable ring.

Figure 17A:
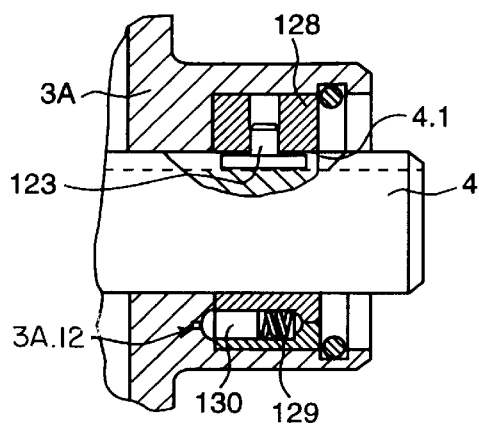
FIG. 17A is a partial main view of overload seperating device of the semi-nut open and closing mechanism wherein the device is of axial guiding piller (or ball) type.
Figure 17B:
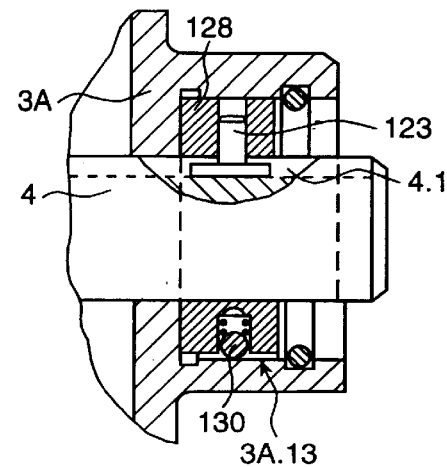
FIG. 17B is a partial main view of overload separating device of the semi-nut opening and closing mechanism wherein the device is of radial ball (or pillar) type.

FIG. 17A is an overload seperating device of the type of axially distributed guide pillar (or steel bar). Its working principle in as follows: On the left end face of a sliding sleeve 128 which encloses around the screw 4, there are radial small holes, small compression springs 129 and a guide pillar 130 (or steel ball) are fitted into the small holes, and engages with the resistant small cone pits 3A.12 which are provided on the right end face of the up-and-down sleeve 3A. The operating process is essentially the same as FIG. 15A, the only difference is that, the pure end face friction in FIG. 15A is changed into small cone pit resisting with guide piller (or steel ball) in FIG. 17A. The device shown in FIG. 17B is the equivalent mechanical structure of that shown in FIG. 17-I, where the axially arranged holes of guide pillar in FIG. 17A have been changed into radially arranged holes in FIG. 17B where 3A.13 represents an axially resistant groove.

Figure 18:
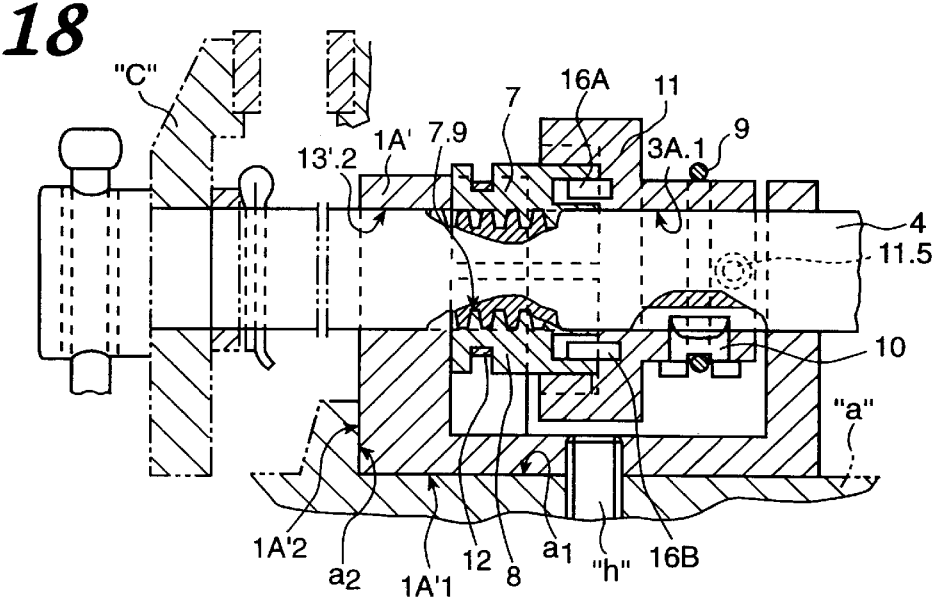
FIG. 18 is a main view of the "F nut pair" of the invention when it is used on the practical carrier of a bench vice.
Figure 19:
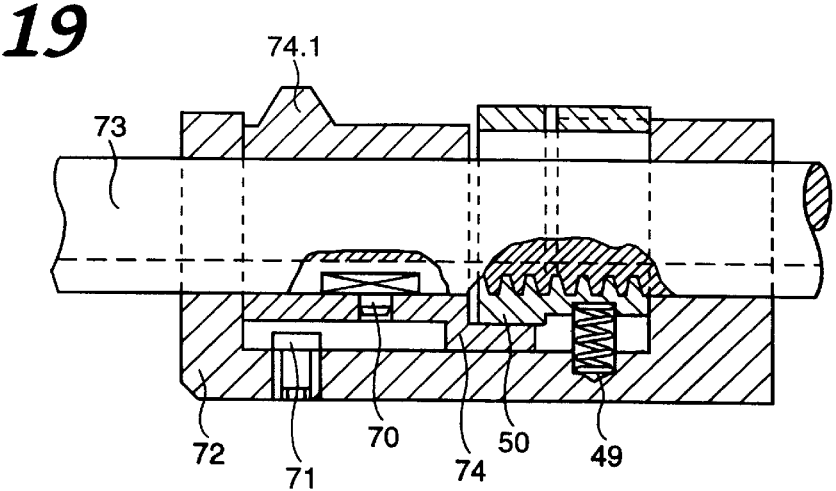
FIG. 19A is a schematic view of the embodiment of a "quick distance adjusting and positioning means" which employs the "F nut pair" of the invention and can be used for when arbitrary distance adjusting and setting is required.

Summarizing the above, although the carrier related is a screw jack which can quickly or slowly up or down, but the most essential nucleus of the invention is a "F nut pair". That mechanism has a wide variety uses an applied carrier. If the applied carrier is a screw jack, then that screw jack is a "double speed screw jack". If the applied carrier is a bench vice, then the invention is a quickly or slowly, opening or closing bench vice. For instance, FIG. 18 is the embodiment which uses the "F nut pair" as shown in FIG. 2A, but the carrier is changed from a screw jack to a bence vice. The method of retrofitting really is very simple. One needs only to change the connecting part between the respective carrier and the "F nut pair". For example the pivot axle $O_1$ on the supporting seat 1A in FIG. 2 is omitted, and the bottom plane 1A'1 and vertical plane 1A'2 on the supporting seat 1A' are utilized to directly contact with the corresponding positioning planes $a_1$ and $a_2$ on the fixed body "a" of the bench vice, and the screws "h" are used for fastening. While the screw 4 needs only to connect with the movable body of the bench vice, others remain unchanged. Furthermore, it is possible to derive many other devices which may be used for other purposes. For example FIG. 19A is derived from FIG. 11A by changing pawl 10 into a guide key 70, while the speed-changing device 17 is omitted and adding a stop block 74.1 on the left outer periphery of the up-and-down sleeve is added. Adding a positioning block 71 on the supporting seat 72, and changing over the connecting manner between the supporting seat and the carrier is necessary, while other structures remain the same as FIG. 2A. Thus FIG. 19A becomes a quick positioning device which employs the "F nut pair". The positioning device can be used in at least two methods of application: One of which is to fix the supporting seat, let the screw move in axial direction at will. When it is positioned, rotate the screw 73 in M direction about one turn, so the position can be locked soon. The invention can be used in a quick bench vice, where it needs only adding a drive screw at the rear end of the screw to apply a clamping force; the other method is to fix the screw, where in that case, the supporting seat must rotate inversely in N direction about one turn, then it can move at will. When the screw reaches the desired position, the screw further rotates in M direction about one turn, so that the supporting seat can be locked at a certain position on the screw 73. The invention can be used in rigid stroke stop block where the axial force is considerably large and the axial position are frequently required to adjust.

As a summary, the applied carrier of the "F nut pair" of the invention, besides in the screw jack, it can be used further in: a bench vice, a machine vice, a pipe vice, a sliding table of a machine tool, a tailstock of a lathe, an architectural scaffold whose height can be adjusted. All of the aforementioned embodiments are within the scope of the invention. It needs only using some common methods to change the connection with the above applied carrier.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

We claim:

1. An elastically engaging screw-and-nut mechanism comprising:

a screw;

a first semi-nut with threads;

a second semi-nut with threads;

a supporting seat including support arms, a position limiting member, a support hole, a supporting body, and guideways disposed between said support arms;

a sleeve, said first and second semi-nuts being disposed between said sleeve and said supporting seat, said semi-nuts contacting said guideways of said supporting seat;

a screw being supported by said supporting seat and disposed within said support hole and being enclosed by said sleeve and said semi-nuts;

an antishift device for preventing shifting of said sleeve along an axial direction of said screw;

an elastically engaging actuating element which engages with said semi-nuts;

a rigid self-locking actuating element for rigidly locking said semi-nuts;

a separating actuating device disposed on each semi-nut for separating said first and second semi-nuts; and an overload separating device whereby when said separating actuating devices separate said semi-nuts, said screw moves at a first speed in a translational manner past said semi-nuts, and when said rigid self-locking actuating element locks said semi-nuts, said screw moves at a second speed in a rotative manner past said semi-nuts, said first speed being substantially greater than said second speed, said engagement between said semi-nuts and said screw is in an elastic manner, and said locking of said semi-nuts is in a rigid manner, and said separating of said semi-nuts-and said screw is in a rigid manner.

2. The screw-and-nut mechanism of claim 1, wherein each semi-nut includes an outer curved groove, said separating actuating device includes end face cam grooves, said sleeve further includes guide pins, said end face cam grooves engage with said guide pins, said elastically engaging actuating element includes a retractable plate spring contacting each outer curved groove of a respective semi-nut, and said rigid self-locking actuating element includes curved cam profiles disposed on said sleeve.

3. The screw-and-nut mechanism of claim 1, further comprising a speed changing device which alters the speed at which said screw moves past said semi-nuts, said speed changing device includes a supporting seat, a locking device, said locking device further includes an inserting pin, a spring, and a handle, said inserting pin engaging a locking hole in said sleeve in a first position, and being spaced apart from said locking hole in a second position.

* * * * *